United States Patent [19]
Boell et al.

[11] 3,876,649
[45] Apr. 8, 1975

[54] PRODUCTION OF 2-METHYLPYRIDIN-3-OL DERIVATIVES

[75] Inventors: Walter Boell, Mutterstadt; Horst Koenig, Ludwigshafen, both of Germany

[73] Assignee: Badishe Anilin- & Soda-Fabrik Aktiengesellschaft, Ludwigshafen, Rhein, Germany

[22] Filed: Aug. 23, 1972

[21] Appl. No.: 283,170

[30] Foreign Application Priority Data
Sept. 2, 1971 Germany.............................. 2143989

[52] U.S. Cl... 260/295.5 V; 260/297 V; 260/397 T; 260/297.5; 260/338; 260/347.2; 424/263
[51] Int. Cl............................................. C07d 31/36
[58] Field of Search......... 260/297 V, 297 T, 297.5, 260/295 VB, 295.5 V

[56] References Cited
UNITED STATES PATENTS

| | | | |
|---|---|---|---|
| 3,227,724 | 1/1966 | Pfister et al..................... | 260/297 V |
| 3,381,014 | 4/1968 | Harris et al...................... | 260/294.9 |
| 3,525,749 | 8/1970 | Chamberlin et al............. | 260/297.5 |

Primary Examiner—Alan L. Rotman
Attorney, Agent, or Firm—Johnston, Keil, Thompson & Shurtleff

[57] ABSTRACT

Production of 2-methylpyridin-3-ol derivatives including pyridoxine derivatives and pyridoxine (vitamin $B_6$) itself by reaction of 4-methyloxazole with derivatives of 1,4-disubstituted but-2-en-2-ylsulfones in the manner of a Diels-Alder reaction.

13 Claims, No Drawings

PRODUCTION OF 2-METHYLPYRIDIN-3-OL DERIVATIVES

This invention relates to a process for the production of 2-methylpyridin-3-ol derivatives, including pyridoxine derivatives and pyridoxine (vitamin B₆) itself.

It is known that derivatives of pyridoxine can be prepared by condensation of certain oxazoles with certain dienophils in a Diels-Alder reaction [cf. M. Ya. Karpeiskii and V. L. Florentiev, Russian Chemical Reviews, 38, 540 (1969)]. The dienophilic components used are either derivatives of maleic and fumaric acid (which although reacting easily necessitate an expensive reduction step for conversion into pyridoxine) or derivatives of 2-butene-1,4-diol. In the latter case the intermediates may be converted into pyridoxine under hydrolytic conditions. The lesser activity of these dienophils makes more drastic reaction conditions necessary and this has an unfavorable effect on the yields. Attempts to overcome this disadvantage by using 2-cyano-1,4-dimethoxybut-2-ene as the dienophilic component (Japanese Patent Application No. 22,740/1965) have not provided a remedy. The yield of 2-methyl-4,5-bis-(methoxymethyl)-pyridin-3-ol remains so small that this method is inferior to the prior art methods.

We have now found that pyridoxine derivatives and if desired pyridoxine itself are obtained in an advantageous manner and with good yields by converting 4-methyloxazole with a derivative of a 1,4-disubstituted but-2-en-2-yl-sulfone (hereinafter called butenylsulfones for short) of the formula:

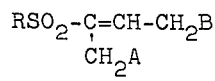

(in which R is unsubstituted or substituted alkyl, cycloalkyl, aralkyl or aryl,
—CH₂A is a group convertible by hydrolysis into the group —CH₂OH, and
—CH₂B is a group convertible by hydrolysis into the group —CH₂OH and is identical with or different from —CH₂A) into a compound of the formula:

and if desired converting the radicals —CH₂A and —CH₂B into the group —CH₂OH by a conventional method.

The reaction proceeds in the manner of a Diels-Alder reaction and may be represented by the following equation:

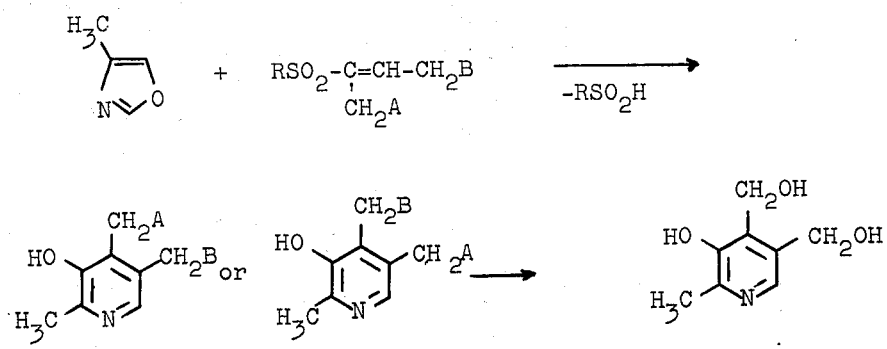

The preferred radicals R of the butenylsulfones are alkyl and cycloalkyl of one to six carbon atoms such as methyl, ethyl, propyl and cyclohexyl, which may bear substituents, such as trifluoromethyl, chloromethyl and trichloromethyl, aralkyl such as benzyl, and aryl such as phenyl, tolyl, chlorophenyl, anisyl and nitrophenyl. Preferred radicals CH₂A and CH₂B are groups which can readily be converted by hydrolysis into the hydroxymethyl groups of the pyridoxine. It should be noted however that these groups are preferred merely because conversion into the pyridoxine is simplified by their use and that the groups which are not preferred are to be regarded as equally effective in the production of 2-methylpyridin-3-ol derivatives. The groups —CH₂A and —CH₂B may be particularly etherified or esterified methylol groups, and the halides and alkyl and acyl derivatives are to be understood as being included. The substituents A and B may also be expressed by the radicals —O—R', —O—CO—R", —O—CR"₂—OR' and X where R' is a hydrocarbon substituent of preferably one to ten carbon atoms, R" is hydrogen or similarly a hydrocarbon radical and X is halogen, particularly bromine or chlorine. The radicals —CH₂A and —CH₂B may also be combined together to form a heterocycle in which A and B together denote oxygen such as in a 2,5-dihydrofuran. The substituents A and B are chloro, bromo, methoxy, —O—R', or —O—CO—R" wherein R' and R" are alkyl with one to 10 carbon atoms. A and B may also be combined with the formation of a dioxepin ring. These cyclic compounds also contain the skeleton of butene-(2).

The radicals —CH₂A and —CH₂B are conveniently converted into methylol groups by hydrolysis with aqueous or alcoholic mineral acid such as hydrochloric acid.

Representative examples of butenylsulfones which may be used for reaction with 4-methyloxazole according to the process of this invention are:
2-methylsulfonyl-1,4-dimethoxybut-2-ene,
2-isopropylsulfonyl-1,4-bismethoxymethoxybut-2-ene,
2-trifluoromethylsulfonyl-1,4-dimethoxybut-2-ene,
2-phenylsulfonyl-1,4-dimethoxybut-2-ene,
2-ethylsulfonyl-1,4-diacetoxybut-2-ene, 2-benzylsulfonyl-1,4-diacetoxybut-2-ene,
3-methylsulfonyl-2,5-dihydrofuran,
3-trichloromethylsulfonyl-2,5-dihydrofuran,
3-phenylsulfonyl-2,5-dihydrofuran,
5-methylsulfonyl-4,7-dihydro-1,3-dioxepin,
2-n-butylsulfonyl-1,4-dichlorobut-2-ene,
2-p-nitrophenylsulfonyl-1,4-dichlorobut-2-ene,
2-phenylsulfonyl-1,4-diacetoxybut-2-ene,
3-p-nitrophenylsulfonyl-2,5-dihydrofuran,
3-chloromethylsulfonyl-2,5-dihydrofuran,
2-p-tolylsulfonyl-1-acetoxy-4-methoxybut-2-ene,
2-p-tolylsulfonyl-1-methoxy-4-acetoxybut-2-ene,
5-p-chlorophenylsulfonyl-4,7-dihydro-1,3-dioxepin and
5-methylsulfonyl-2-isopropyl-4,7-dihydro-1,3-dioxepin.

The process of this invention generally proceeds at temperatures of from about 50°C to about 200°C, preferably from about 80° to about 150°C. The reaction may be carried out in a solvent or mixture of solvents which does not interfere with the reaction, although the presence of solvents is not essential in carrying out the process of the invention.

Examples of solvents which may be used as reaction media are hydrocarbons which may have been chlorinated or modified in some other way such as benzene, toluene, xylene, chlorobenzene, heptane, 1,2-dimethoxyethane, acetonitrile, N,N-dimethylformamide and nitromethane.

The invention may be carried out for example by bringing the mixture of reactants to the desired temperature for a period sufficient to complete the reaction. The reaction is over after about 1 hour to 4 days in the range from about 80° to about 150°C. It is convenient to use an excess of one reactant, preferably of 4-methyloxazole. After the end of the reaction any unreacted 4-methyloxazole and butenylsulfone and any solvent used are distilled off at subatmospheric pressure or separated by crystallization and the pyridoxine derivative is obtained from the residue as such by distillation or crystallization or in the form of a mineral acid salt by extraction by means of an aqueous mineral acid. In some cases the pyridoxine derivative crystallizes out during the reaction or after the reaction is over on cooling and can then be isolated by simple filtration. The pyridoxine derivatives obtained may be converted into pyridoxine in conventional manner by simple acid hydrolysis.

Another variant of the process consists in heating one of the reactants to the desired reaction temperature in the absence or presence of a solvent whereupon the other reactant, if desired in the form of a solution, is added, allowed to flow in or dripped in.

The reaction may be accelerated by stirring, shaking or other mechanical expedients. It is generally advantageous to allow the reaction to proceed in a closed vessel, for example in a sealed tube or an autoclave.

The sulfinic acid $RSO_2H$ formed by elimination in the reaction of 4-methyloxazole with a butenylsulfone can be collected by an excess of the butenylsulfone in the form of a vicinal disulfone compound and, after this has been separated from the mixture, eliminated again by the action of a base with the reformation of butenylsulfone. The sulfinic acid may moreover be combined as a salt in the reaction mixture or oxidized after an oxidizing agent has been added.

The butenylsulfones used for the reaction are novel compounds which have not yet been described. They may be prepared by methods generally used for the production of vinylsulfones, for example by adding on an alkylmercaptan or thiophenol to a but-2-yne derivative (in this context we understand by derivative the appropriate precursors having the radicals $-CH_2A$ and $-CH_2B$) followed by oxidation of the butenylsulfides obtained to butenylsulfones, or by adding on a sulfinic acid to a but-2-yne derivative, or by adding on an alkyl or aryl sulfur halide to a but-2-ene derivative followed by oxidation of the mercapto compound to a $\beta$-halosulfone of the formula:

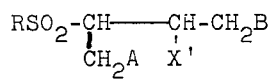

where X' is halogen.

There are also accessible by adding on alkyl or aryl sulfonyl halides to but-2-ene derivatives and are converted into the desired butenylsulfones by elimination of hydrogen halide by means of a base. Pyridine, trialkylamines such as triethylamine, aqueous and alcoholic caustic alkali solutions, potassium tertiary-butylate or sodium hydride are examples of suitable bases. In a special embodiment of this invention, elimination of hydrogen halide may be effected in the reaction mixture with 4-methyloxazole by further reacting the butenylsulfone (without having to isolate it) with 4-methyloxazole to form the pyridoxine derivative.

It is extremely surprising in the process of this invention that the reaction, without additional catalysis by acids or bases, should yield the pyridoxine derivative in a single and smooth step. This proves to be a great advantage inasmuch as the isomerization of the bicyclic Diels-Alder adduct first formed (cf. the cited Review article) and the elimination of the sulfinic acid in separate steps can be dispensed with. An additional advantage of the reaction lies in the possibility of using 4-methyloxazole as a reactant which is readily accessible according to German Laid-Open Specification No. 1,670,165.

The invention is illustrated by the Examples.

EXAMPLE 1

3-methylsulfonyl-2,5-dihydrofuran:

A solution of 41.5 g of methyl sulfur chloride (prepared from dimethyl disulfide and sulfuryl chloride by the method of Mueller, J. Amer. Chem. Soc., 90, 2075 (1968) in 150 ml of dry carbon tetrachloride is dripped at −20°C into a solution of 35 g of 2,5-dihydrofuran in 150 ml of dry carbon tetrachloride. The solvent is then removed through a column and the residue is distilled. 64 g of 3-methylmercapto-4-chlorotetrahydrofuran is obtained having a boiling point of 52° to 53°C at 0.7 mm.

The distillate is dissolved in 200 ml of glacial acetic acid and 61.5 g of 50% hydrogen peroxide is dripped in at room temperature with efficient cooling. The whole is allowed to stand at room temperature for 24 hours, the solvent is withdrawn in vacuo through a column and the residue is distilled. 74 g of 3-methylsulfonyl-4-chlorotetrahydrofuran is obtained having a boiling point of 120°C at 0.3 mm.

A mixture of the sulfone with 45 g of triethylamine and 240 ml of benzene is heated, while stirring, for 1 hour at 30°C and for 3 hours at 40°C. The precipitate is suction filtered, the residue washed with benzene and the filtrate concentrated. Distillation of the residue gives 56.5 g of 3-methylsulfonyl-2,5-dihydrofuran having a boiling point of 100° to 101°C at 0.1 mm and a melting point of 43° to 44°C after recrystallization from a mixture of benzene and ether.

C, H determination: found: C 40.6% H 5.6%
calculated: C 40.5% H 5.4%.
IR spectrum:
absorption at 1632 (C=C), 1300 and 1150 cm$^{-1}$ (SO$_2$).

2-methyl-4,5-epoxydimethylpyridin-3-ol:

4.45 g of 3-methylsulfonyl-2,5-dihydrofuran and 10 g of 4-methyloxazole are heated at 130°C in a sealed tube for 8 hours. The excess 4-methyloxazole is withdrawn in vacuo and the residue is suspended in methylene chloride. The undissolved portion is suction filtrated and extracted with 5 ml of 12% aqueous hydrochloric acid. After evaporation of the aqueous extract in vacuo, 2.75 g of crude 2-methyl-4,5-epoxydimethylpyridin-3-ol hydrochloride remains which is purified by recrystallization from ethanol. Melting point 233° to 237°C (cf. S. A. Haris and K. Folkers, J. Amer. Chem. Soc., 61, 3307 (1939), melting point 239° to 240°C; R. A. Firestone, E. E. Harris and W. Reuter, Tetrahedron, 23, 943 (1967), melting point 231° to 239°C).

2-methyl-4,5-epoxydimethylpyridin-3-ol having a melting point of 250° and 252°C can be obtained from the residue insoluble in methylene chloride by recrystallization from ethanol.

Determination of C, H and N:
found: C 63.5% H 6.1% N 9.3%
calculated: C 63.6% H 6.0% N 9.3%.
UV-spectrum:
maxima in 0.1 N hydrochloric acid solution at 282 nm ($\epsilon$ = 8400) and in 0.1 N caustic soda solution at 243 mm ($\epsilon$ = 8000) and 292 nm ($\epsilon$ = 7100).

The compound is converted into pyridoxine by heating with 48% hydrobromic acid and hydrolysis of the resulting 2-methyl-4,5-bis-bromomethylpyridin-3-ol.

EXAMPLE 2

2-methyl-4,5-epoxydimethylpyridin-3-ol:

2.2 g of 3-methylsulfonyl-2,5-dihydrofuran and 1.25 g of 4-methyloxazole are heated in an ampoule for 2 hours at 150°C. The mixture is suspended in methylene chloride, and the undissolved portion is suction filtered and extracted with 6% aqueous hydrochloric acid. The extract is concentrated in vacuo. Crude 2-methyl-4,5-epoxydimethylpyridin-3-ol hydrochloride is obtained which is recrystallized from ethanol to purify it. The melting point is 233° to 237°C.

EXAMPLE 3

2-methyl-4,5-epoxydimethylpyridin-3-ol:

A solution of 6.65 g of 3-methylsulfonyl-2,5-dihydrofuran in 30 g of 4-methyloxazole is boiled for 120 hours. Upon cooling, 3.2 g of 2-methyl-4,5-epoxydimethylpyridin-3-ol, melting point 244° to 247°C, crystallizes out. Recrystallization from ethanol gives the pure product; melting point 250° to 252°C.

EXAMPLE 4 trans-2-methylsulfonyl-1,4-dimethoxybut-2-ene:

This is prepared by the reaction described in Example 1 starting from cis-1,4-dimethoxybut-2-ene.
2-methylmercapto-3-chloro-1,4-dimethoxybutane; boiling point 58°C at 0.1 mm.
2-methylsulfonyl-3-chloro-1,4-dimethoxybutane; boiling point 112°C at 0.1 mm.
trans-2-methylsulfonyl-1,4-dimethoxybut-2-ene; boiling point 93°C at 0.12 mm; melting point 57° to 58° after recrystallization from a mixture of benzene and cyclohexane.

Determination of C and H:
found: C 43.4% H 7.3%
calculated: C 43.3% H 7.3%.
IR-spectrum:
absorptions at 1665 (C=C), 1290 and 1120 (SO$_2$), and 840 cm$^{-1}$ (C=C).

2-methyl-4,5-bismethoxymethylpyridin-3-ol:

5.85 g of trans-2-methylsulfonyl-1,4-dimethoxybut-2-ene and 10 g of 4-methyloxazole are heated for 8 hours at 150°C in a sealed tube. Excess 4-methyloxazole and unreacted trans-2-methylsulfonyl-1,4-dimethoxybut-2-ene are separated by distillation in vacuo. The reside is taken up in chloroform and extracted with 6% aqueous hydrochloric acid. The hydrochloric acid extract is evaporated. Crude 2-methyl-4,5-bismethoxymethylpyridin-3-ol hydrochloride remains. It is recrystallized from isopropanol to purify it. Melting point 145° to 148°C (cf. R. A. Firestone, E. E. Harris and W. Reuter, Tetrahedron, 23, 943 (1967); melting point 146.5° to 149°C).

EXAMPLE 5 cis-2-methylsulfonyl-1,4-dimethoxybut-2-ene:

Production is carried out analogously to Example 1 starting from trans-1,4-dimethoxy-but-2-ene:
2-methylmercapto-3-chloro-1,4-dimethoxybutane; boiling point 65°C at 0.1 mm.
2-methylsulfonyl-3-chloro-1,4-dimethoxybutane: melting point 86°C after recrystallization from a mixture of benzene and ether.
cis-2-methylsulfonyl-1,4-dimethoxybut-2-ene; boiling point 115° to 116°C at 0.2 mm.

Determination of C and H:
found: C 43.5% H 7.3
calculated: C 43.3% H 7.3%.
IR-spectrum:
absorptions at 1655 (C=C), 1300 and 1145 cm$^{-1}$ (SO$_2$).

2-methyl-4,5-bismethoxymethylpyridin-3-ol:

5.85 g of cis-2-methylsulfonyl-1,4-dimethoxybut 2-ene and 10 g of 4-methyloxazole are heated in a sealed tube for 8 hours at 150°C. Excess 4 methyloxazole and unreacted sulfone are separated by distillation in vacuo. The residue is taken up in chloroform and extracted with 6% aqueous hydrochloric acid The hydrochloric acid extract is evaporated. Crude 2 methyl-4,5-bismethoxy-methylpyridin-3-ol hydrochloride remains. To purify it is recrystallized from isopropanol; melting point 145° to 147°C.

EXAMPLE 6

5-methylsulfonyl-4,7-dihydro-1,3-dioxepin:

Production is carried out by the method of Example 1 starting from 4,7-dihydro-1,3-dioxepin.

5-methylmercapto-6-chloro-1,3-dioxepin; boiling point 68° to 71°C at 0.15 mm.

5-methylsulfonyl-4,7-dihydro-1,3-dioxepin; melting point 76° to 78°C after recrystallization from a mixture of benzene and ether.

Determination of C and H:
FOUND: C 40.6% H 5.7%
calculated: C 40.4% H 5.7%.
IR-spectrum:
absorption at 1650 (C=C), 1290 and 1135 cm$^{-1}$ (SO$_2$).

2-methyl-4,5-(methylenebisdioxymethyl)-pyridin-3-ol: (1,5-dihydro-8-methyl-(1,3)-dioxepino-[5,6,c]-pyridin-9-ol)

Production is carried out analogously to the reaction described in Example 4 starting from 5.35 g of 5-methylsulfonyl-4,7-dihydro-1,3-dioxepin. The crude product is sublimed and recrystallized from ethanol and ether. 2-methyl-4,5-(methylenebisdioxymethyl)-pyridin-3-ol hydrochloride is obtained having a melting point of 205° to 208°C (cf. R. A. Firestone, E. E. Harris and W. Reuter, Tetrahedron, 23, 943 (1967); melting point 208° to 208.5°C).

EXAMPLE 7

3-phenylsulfonyl-2,5-dihydrofuran:

A solution of 29 g of phenyl sulfur chloride (prepared from chlorine and thiophenol as prescribed by Almasi and Hantz, Chem. Ber., 94, 728 (1961)) in 100 ml of dry carbon tetrachloride is dripped at +25°C into a solution of 14 g of 2,5-dihydrofuran in 100 ml of dry carbon tetrachloride. The whole is stirred for another half an hour, the solvent is removed through a column and the residue is distilled. 39 g of 3-phenylmercapto-4-chlorotetrahydrofuran is obtained; boiling point 125° to 130°C at 0.15 mm.

The distillate is dissolved in 90 ml of glacial acetic acid and 90 ml of acetic anhydride and at 50° to 60°C 26 g of 50% hydrogen peroxide is dripped in while cooling well. After stirring for half an hour at 50°C, the solvent is removed in vacuo through a column and the residue is taken up in 120 ml of benzene. 20 g of triethylamine is added dropwise at room temperature and the mixture stirred for 5 hours at the same temperature, washed with water and dried. The solvent is removed. 36 g of 3-phenylsulfonyl-2,5-dihydrofuran is obtained; melting point 67° to 68°C (after recrystallization from a mixture of benzene and cyclohexane; melting point 69°C).

Determination of C and H:
found: C 57.4% H 5.0%
calculated: C 57.2% H 4.8%
IR-spectrum:
absorptions at 1610 (C=C), 1295 and 1145 cm$^{-1}$ (SO$_2$).

2-methyl-4,5-epoxydimethylpyridin-3-ol:

2.1 g of 3-phenylsulfonyl-2,5-dihydrofuran and 5 g of 4-methyloxazole are heated for 3 hours at 140°C in an ampoule. The excess 4-methyloxazole is removed in vacuo and the residue is suspended in methylene chloride. The undissolved portion is suction filtered. 0.6 g of 2-methyl-4,5-epoxydimethylpyridin-3-ol is obtained; melting point 241° to 243°C. For further purification it is recrystallized from ethanol; melting point 250° to 252°C.

EXAMPLE 8

2-methyl-4,5-epoxydimethylpyridin-3-ol:

2.1 g of 3-phenylsulfonyl-2,5-dihydrofuran, 0.85 g of 4-methyloxazole and 3 ml of benzene are heated in an ampoule for 4 hours at 140°C. The suspension remaining undissolved in the hot benzene solution is suction filtered and 2-methyl-4,5-epoxydimethylpyridin-3-ol is obtained which for further purification is recrystallized from ethanol; melting point 250° to 252°C.

EXAMPLE 9

2-methyl-4,5-epoxydimethylpyridin-3-ol:

10 g of 3-phenylsulfonyl-4-bromotetrahydrofuran (melting point 53° to 55°C) and 12 g of 4-methyloxazole are heated for 6 hours in an autoclave at 150°C. The reaction product is suspended in methylene chloride, the undissolved residue is extracted with 12% hydrochloric acid and the extract is treated with animal charcoal. The aqueous solution is concentrated. The crude 2-methyl-4,5-epoxydimethylpyridin-3-ol hydrochloride is recyrstallized from ethanol to purify it.

EXAMPLE 10

2-methyl-4,5-bisacetoxymethylpyridin-3-ol:

6.3 g of 2-phenylsulfonyl-1,4-diacetoxybut-2-ene (mixture of cis and trans isomers) and 6.6 g of 4-methyloxazole are heated for 8 hours at 150°C. Excess 4-methyloxazole is removed in vacuo and the residue is taken up in benzene. Hydrogen chloride gas is passed in so that crude 2-methyl-4,5-bisacetoxymethylpyridin-3-ol is precipitated as the hydrochloride. The product is hydrolyzed to pyridoxine by heating in aqueous hydrochloric acid. The pyridoxine can be isolated as hydrochloride by concentrating the aqueous phase.

EXAMPLE 11

2-methyl-4,5-epoxydimethylpyridin-3-ol:

In the manner described in Example 7 3-p-nitrophenylsulfonyl-2,5-dihydrofuran (melting point 148° to 150°C) is reacted with 4-methyloxazole. The crude 2-methyl-4,5-epoxydimethylpyridin-3-ol is purified by sublimation and recrystallization from ethanol; melting point 250° to 252°C.

EXAMPLE 12

2-methyl-4,5-epoxydimethylpyridin-3-ol:

4.55 g of 3-chloromethylsulfonyl-2,5-dihydrofuran (boiling point 115° to 120°C at 0.2 mm) and 4.15 g of 4-methyloxazole are heated at 110°C in a sealed tube for 5 hours. Working up is carried out as described in Example 1. 2-methyl-4,5-epoxydimethylpyridin-3-ol is obtained as the hydrochloride having a melting point of 231° to 237°C.

We claim:

1. A process for the production of 2-methylpyridin-3-ol derivatives wherein 4-methyloxazole is reacted with a derivative of a 1,4-disubstituted but-2-en-2-ylsulfone of the formula:

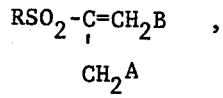

2,5-dihydrofuran substituted in the 3-position by RSO$_2$—, or a 4,7-dihydro-1,3-dioxepin substituted in the 5-position by RSO$_2$— where R is unsubstituted or substituted alkyl of 1–6 carbon atoms, cycloalkyl of up to six carbon atoms, benzyl, phenyl or substituted phenyl;

—CH₂A is a radical convertible by hydrolysis into the group —CH₂OH;

and

—CH₂B is a radical convertible by hydrolysis into the group —CH₂OH and is identical with or different from —CH₂A; A and B respectively are chloro, bromo, methoxymethoxy, —O—R', or —O—CO—R'' wherein R' and R'' are alkyl with one to 10 carbon atoms, or wherein 4-methyloxazole is reacted with either a 4-halotetrahydrofuran substituted in the 3-position by RSO₂ wherein R has the meanings given above or a compound of the formula

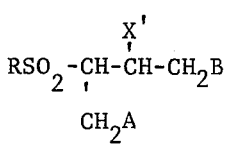

in which R and the radicals —CH₂A and —CH₂B have the meanings given above and X' is halogen in the presence of a base functioning in the reaction mixture to eliminate hydrogen halide from said compounds; to form a compound of the formula:

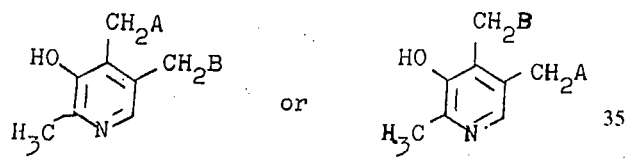

wherein —CH₂A and —CH₂B have the same meanings as aforedefined, 2-methyl-4,5-epoxydimethylpyridin-3-ol or a 1,5-dihydro-8-methyl-(1,3)-dioxepino-[5,6,c]-pyridin-9-ol.

2. A process for the production of 2-methylpyridin-3-ol derivatives wherein 4-methyloxazole is reacted with a derivative of a 1,4-disubstituted but-2-en-2-ylsulfone of the formula:

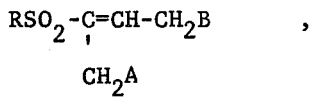

2,5-dihydrofuran substituted in the 3-position by RSO₂— or a 4,7-dihydro-1,3-dioxepin substituted in the 5-position by RSO₂— where R is unsubstituted or substituted alkyl of 1-6 carbon atoms, cycloalkyl of up to six carbon atoms, benzyl, phenyl or substituted phenyl;

—CH₂A is a radical convertible by hydrolysis into the group —CH₂OH;

and

—CH₂B is a radical convertible by hydrolysis into the group —CH₂OH and is identical with or different from —CH₂A; A and B respectively are chlorine, bromine, methoxymethoxy, methoxy, or acetoxy; or wherein 4-methyloxazole is reacted with either a 4-halotetrahydrofuran substituted in the 3-position by RSO₂ wherein R has the meanings given above or a compound of the formula

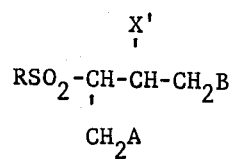

in which R and the radicals —CH₂A and —CH₂B have the meanings given above and X' is halogen in the presence of a base functioning in the reaction mixture to eliminate hydrogen halide from said compounds; to form a compound of the formula:

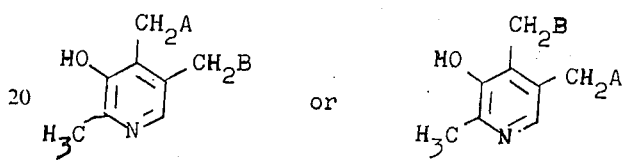

where —CH₂A and —CH₂B have the same meanings as aforedefined, 2-methyl-4,5-epoxydimethylpyridin-3-ol or a 1,5-dihydro-8-methyl-(1,3)-dioxepino-[5,6,c]-pyridin-9-ol.

3. A process as claimed in claim 1, wherein the 1,4-disubstituted but-2-en-2-yl sulfone is allowed to form immediately prior to or during the reaction by starting from said compound of the formula:

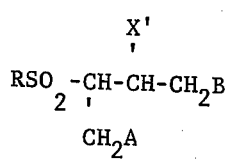

in which R, X', —CH₂A and —CH₂B havke the meanings given above, and the corresponding 1,4-disubstituted but-2-en-2-ol sulfone is formed by elimination of said hydrogen halide from said compound of said formula in the presence of said base.

4. A process as claimed in claim 1 wherein 3-methylsulfonyl-2,5-dihydrofuran is used as the 1,4-disubstituted but-2-en-2-yl-sulfone.

5. A process as claimed in claim 3 wherein 3-phenylsulfonyl-2,5-dihydrofuran is used as the 1,4-disubstituted but-2-en-2-ylsulfone.

6. A process as claimed in claim 3 carried out a temperature of from about 50° to about 200°C.

7. A process as claimed in claim 3 wherein 4-methyloxazole is used in excess.

8. A process as claimed in claim 3 wherein R is alkyl having one to six carbon atoms.

9. A process as claimed in claim 3 wherein R is benzyl.

10. A process as claimed in claim 3 wherein R is phenyl, tolyl, chlorophenyl, anisyl or nitrophenyl.

11. A process as claimed in claim 3 wherein said sulfone is 2,5-dihydrofuran substituted in the 3-position by RSO₂—, and R has the meanings given above.

12. A process as claimed in claim 3 wherein said sulfone is a 4,7-dihydro-1,3-dioxepin substituted in the 5-position by RSO₂—, and R has the meanings given above.

13. A process as claimed in claim 3 wherein 2-methylsulfonyl-1,4-dimethoxybut-2-ene is used as the 1,4-disubstituted but-2-en-2-yl-sulfone.

* * * * *

UNITED STATES PATENT AND TRADEMARK OFFICE
CERTIFICATE OF CORRECTION

PATENT NO. : 3,876,649
DATED : April 8, 1975
INVENTOR(S) : BOELL et al

It is certified that error appears in the above-identified patent and that said Letters Patent are hereby corrected as shown below:

In column 10, Claim 5, line 1, delete "3" and substitute --1--

In column 10, Claim 6, line 1, delete "3" and substitute --1--

In column 10, Claim 7, line 1, delete "3" and substitute --1--

In column 10, Claim 8, line 1, delete "3" and substitute --1--

In column 10, Claim 9, line 1, delete "3" and substitute --1--

In column 10, Claim 10, line 1, delete "3" and substitute --1--

In column 10, Claim 11, line 1, delete "3" and substitute --1--

In column 10, Claim 12, line 1, delete "3" and substitute --1--

In column 10, Claim 13, line 1, delete "3" and substitute --1--

Signed and Sealed this eleventh Day of May 1976

[SEAL]

Attest:

RUTH C. MASON
Attesting Officer

C. MARSHALL DANN
Commissioner of Patents and Trademarks